United States Patent [19]

Tahara

[11] Patent Number: 5,490,262

[45] Date of Patent: Feb. 6, 1996

[54] DUAL CACHE MEMORY DEVICE WITH CACHE MONITORING

[75] Inventor: Tamotsu Tahara, Tokyo, Japan

[73] Assignee: Oki Electric Industry Co., Ltd., Tokyo, Japan

[21] Appl. No.: 970,073

[22] Filed: Nov. 2, 1992

Related U.S. Application Data

[63] Continuation-in-part of Ser. No. 574,420, Aug. 28, 1990, abandoned.

[30] Foreign Application Priority Data

Sep. 1, 1989 [JP] Japan ................................ 1-224524
Sep. 1, 1989 [JP] Japan ................................ 1-224525

[51] Int. Cl.[6] ................................................. G06F 13/00
[52] U.S. Cl. ................................................. 395/450
[58] Field of Search ................................................. 395/425

[56] References Cited

U.S. PATENT DOCUMENTS

| | | | |
|---|---|---|---|
| 4,777,594 | 10/1988 | Jones et al. ........................... | 395/375 |
| 4,851,993 | 7/1989 | Chen et al. ........................... | 395/250 |
| 4,982,402 | 1/1991 | Beaven et al. ........................ | 371/12 |
| 4,989,140 | 1/1991 | Nishimukai et al. .................. | 395/800 |

OTHER PUBLICATIONS

Saburo Kaneda, "Genral Purpose Computer", Trans. of Institute of Electronics Information & Communication Engineers of Japan, vol. 73, No. 4, pp. 344–350, Apr. 1990.

Primary Examiner—David L. Robertson
Attorney, Agent, or Firm—Spencer, Frank & Schneider

[57] ABSTRACT

A CPU connected to a memory storing module programs has an instruction cache for reading a module header heading a module program and module instructions following the module header out of the memory, and storing and transferring them. An operand cache reads module data included in the module program of interest out of the memory, and stores and transfers them. A processing section performs arithmetic and logical operations in pipelining with the module header of the module program transferred from the instruction cache and with the module data transferred from the operand cache. A pipelined instruction control controls other circuitry of the CPU by decoding the module instructions of the module program transferred from the instuction cache. The CPU transfers the module header to the processing section via the instruction cache while writing the whole block of module header and module instructions to the instruction cache. Alternatively, the CPU may transfer the module header to the processing section via the operand cache while writing the whole block of module header and successive module instructions to the instruction cache.

5 Claims, 3 Drawing Sheets

DUAL CACHE MEMORY DEVICE WITH CACHE MONITORING

This is a continuation-in-part of application Ser. No. 07/574,420 filed on Aug. 28, 1990 now abandoned.

BACKGROUND OF THE INVENTION

1. Field of the Invention

The present invention generally relates to a central processor unit (CPU) having a cache memory and a cache control method therefor and, more particularly, to a CPU with a cache memory which is useful in executing a program by fetching it from a memory unit.

2. Description of the Related Art

Generally, in an electronic computer, a memory unit having a larger storage capacity needs a larger-scale logical architecture and, therefore, takes a longer period of time in reading data out of the memory. Hence, although the processing rate of a CPU built in the computer may be increased, the overall processing rate of the computer cannot be increased unless the CPU is capable of calling a program of interest at a higher speed.

In the light of the above, some modern computers have a high-speed buffer memory called a cache memory which is successful in reducing the difference between the processing rate of a CPU and the access time necessary for a desired program to be called from a memory unit or main storage. Specifically, a program is called via the cache memory so that the access time of the main storage may follow the processing rate of the CPU.

The cache memory is a small capacity storage and has two different functions, i.e., the function of reading necessary data out of a large capacity storage or memory unit to transfer it to a processing section included in the CPU, and the function of storing a block of data having a predetermined size and including data surrounding the block of data read out of the memory unit together with the data read from the memory unit. More specifically, the cache memory stores data transferred from the memory unit and data surrounding the transferred data. When data to be accessed is present in the data so stored in the cache memory, the CPU directly transfers it to its processing section without accessing the memory unit. It follows that when the CPU hits necesary data successively, the processing rate will be further increased.

However, when a CPU buit in a computer fetches a necessary program from a memory unit to execute it often accesses operands randomly although tending to access instructions sequentially in the order of their addresses. This brings about a problem when it comes to a device of the type reading a program by use of a single cache memory. Namely, writing operands to the single cache memory would disturb the cache processing of instructions being sequentially executed and thereby lower the hitting rate.

In the light of the above, a CPU with two independent cache memories each being exclusively assigned to respective one of instructions and operands has been put to practical use. Typical of this type of CPU is a general-purpose cumputer, FACOM-M780 (tradename) announced by Fujitsu Limited in 1985. See Saburo Kaneda, "General-Purpose Computer", Transactions of the Institute of Electronics, Information and Communication Engineers of Japan, Vol. 73, No. 4, pp. 344–350 (April 1990).

With the CPU having two cache memories as stated above, it has been customary to execute a subroutine or similar program by interrupting or transferring the processing while a certain program as a main program is under way, in the manner described below.

When control is transferred from the main program to a subroutine program, none of the cache memories have been loaded with information associated with the subroutine. The CPU, therefore, accesses the operand cache first so as to transfer the first information of the subroutine program, i.e. a module header stored in a memory unit or main storage to its processing section. In this instance, a block of data including the module header and data surrounding it is written to the operand cache.

By referencing the module header, the CPU calles a subroutine program or similar module program. Specifically, the CPU fetches the first module instruction included in the module program from the main storage to an instruction control thereof via the instruction cache. At this time, a block of module instructions including the first instruction are written to the instruction cache. The instruction control decodes the first module instruction and executes it. Thereafter, the instruction control sequentially reads, and executes successive module instructions which were written to the instruction cache. On the other hand, data to be used along with the instructions are read out of the main storage and transferred to a processing section via the operand cache. In this instance, the operand cache also stores a block of data including data surrounding the data read out. On completion of the module program, the operation returns to the main program.

As state above, the conventional cache control method is such that to call a subroutine or similar module program for executing it, a module header heading the subroutine program stored in the main storage is fetched to the operand cache first so as to register a block of data adjacent to the module header, despite the module header being used only once. This brings about a problem that when the operand cache is used afterwards, the hitting ratio of the cache and, therefore, the utilization efficiency thereof are lowered.

Moreover, when the CPU reads the module header out of the main storage or executes the module instructions of the subroutine program, the instruction cache has not yet been loaded with the module instructions. Hence, the CPU has to read the module instructions out of the main storage, resulting in a substantial access time.

SUMMARY OF THE INVENTION

It is therefore an object of the present invention to provide a CPU with a cache memory which promotes efficient use of an operand cache and, at the beginning of execution of instructions associated with a subroutine program or similar module program, increases the probability that the CPU hits them in an instruction cache to thereby reduce the time necessary for the CPU to access the module instructions, and a cache control method for such a CPU.

In one aspect of the present invention, a CPU connected to a memory unit storing module programs comprises an instruction cache memory for reading a module header heading a module program, and module instructions following the module header, out of the memory unit, and storing and transferring the module header and module instructions, an operand cache memory for reading module data included in the module program out of the memory unit, and storing and transferring the module data, a processing section for performing arithmetic and logical operations in pipelining with the module header of the module program transferred from the instruction cache memory and with the module data transferred from the operand cache memory, and an pipelined instruction control for controlling other circuitry of the CPU by decoding the module instructions of the module program transferred from the instruction cache memory.

In another aspect of the present invention, a cache control method comprises the steps of fetching when a CPU having an instruction cache memory and an operand cache memory is to call a module program from a memoy unit for executing the module program, a module header heading the module program from the memory unit to a processing section of the CPU via the instruction cache, and executing arithmetic and logical operations with the module header, and writing the module header and a block of instructions following the module header to the instruction cache memory for sequentially executing successive processing.

In still another aspect of the invention, a cache control method comprises the steps of fetching, when a CPU having an instruction cache memory and an operand cache memory is to call a module program from a memory unit for executing the module program, a module header heading the module program from the memory unit to a processing section of the CPU via the operand cache, and executing arithmetic and logical operations with the module header, and writing the module header and a block of instructions following the module header to the instruction cache memory for sequentially executing successive processing.

In a further aspect of the invention, a CPU connected to a memory unit storing module programs comprises an instuction cache memory for reading a module header and module instructions of the module program out of the memory unit, and storing and transferring the module header and module instructions, an operand cache memory for reading the module header or the module data out of the memory unit, and storing and transferring the module header or the module data, a processing section for performing arithmetic and logical operations with the module header of the module data transferred from the operand cache memory, and an instruction control for controlling other circuitry of the CPU by decoding the module instructions transferred from the instruction cache memory.

In a still further aspect of the invention, a dual cache memory device for a CPU connected by a memory bus to a memory unit for storing module programs comprises: instruction cache memory means connected to the memory unit through a bus controller and the memory bus for reading a module header of a subroutine program heading the module program and a block of module instructions following said module header out of the memory unit to store said module header and said module instructions in said instruction cache memory means in response to control by said bus controller; operand cache memory means connected to the memory unit through said bus controller and said memory bus for reading module data for arithmetic and logic operations included in the module program out of the memory unit to store said module data in said operand cache memory means in response to control by said bus controller; cache monitoring means connected to said instruction cache memory means, said operand cache memory means and said bus controller for monitoring said operand cache memory means and controlling said bus controller to permit access of said operand cache memory means to said memory unit only when said module data is not stored in said operand cache memory means and transferring the module data stored therein on an operand bus to processing means, said cache monitoring means further permitting access of said instruction cache memory means to said memory unit, continuously monitoring said instruction cache memory means and controlling said bus controller to permit access of said instruction cache memory means only when a block of module instructions is not stored in said instruction cache memory means so as to transfer said block of module instructions to said processing means on a header bus; said processing means being directly connected to said instruction cache memory means through said header bus, and to said operand cache memory means through the operand bus to be operative in pipelining, wherein said processing means performs arithmetic and logical operations with the module header of the module program directly transferred from said instruction cache memory means so as to prepare for a next processing, and said processing means performs arithmetic and logical operations with the module data transferred from said operand cache memory means; and pipeline instruction control means connected between said instruction cache memory means and said processing means through an instruction bus for decoding the module instruction received from said instruction cache memory means so as to execute processing and controlling said processing means in response to a result from decoding the instruction.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
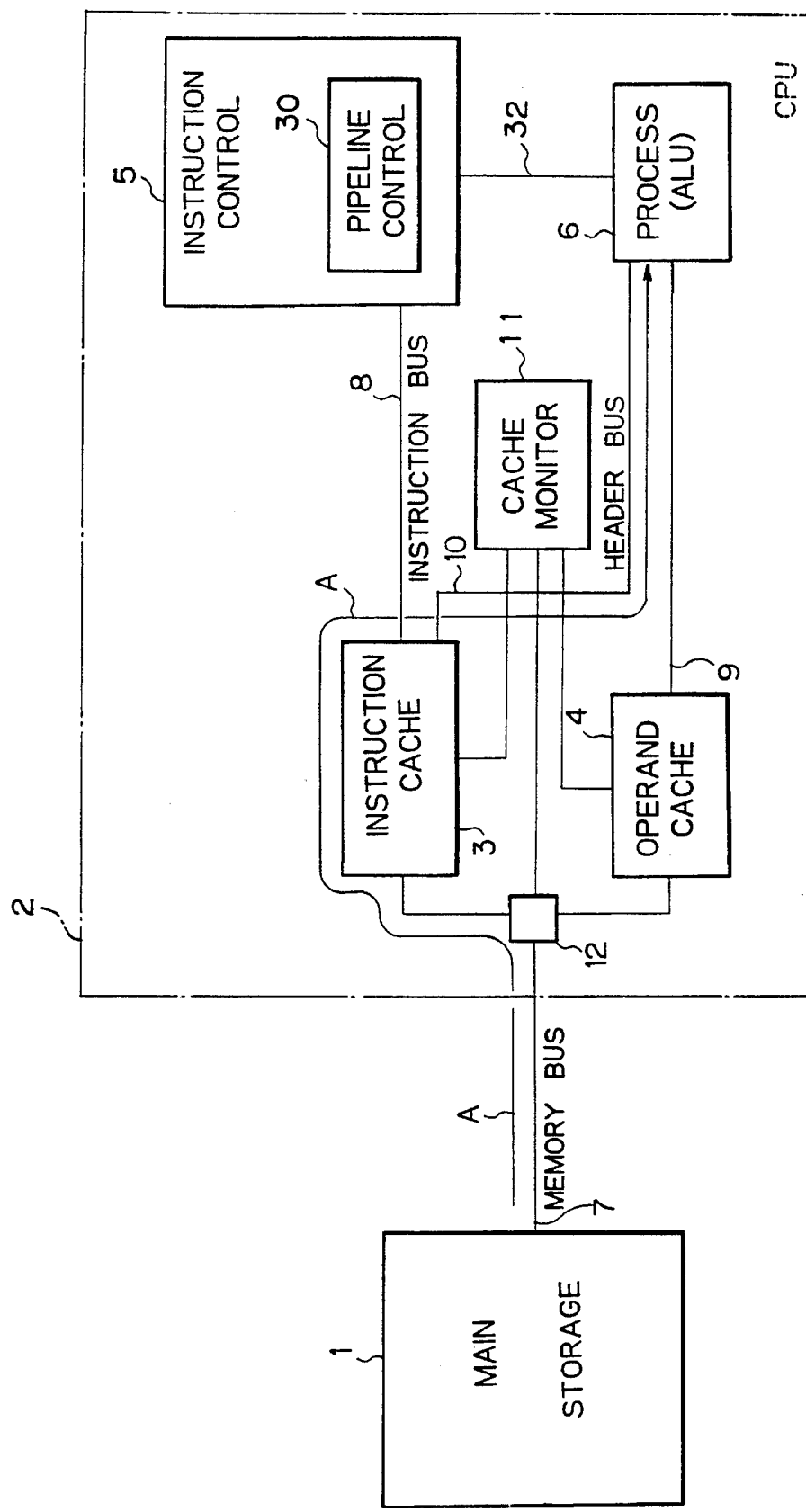
FIG. 1 is a block diagram schematically showing a CPU with a cache memory embodying the present invention and cache control method therefor.
Figure 2:
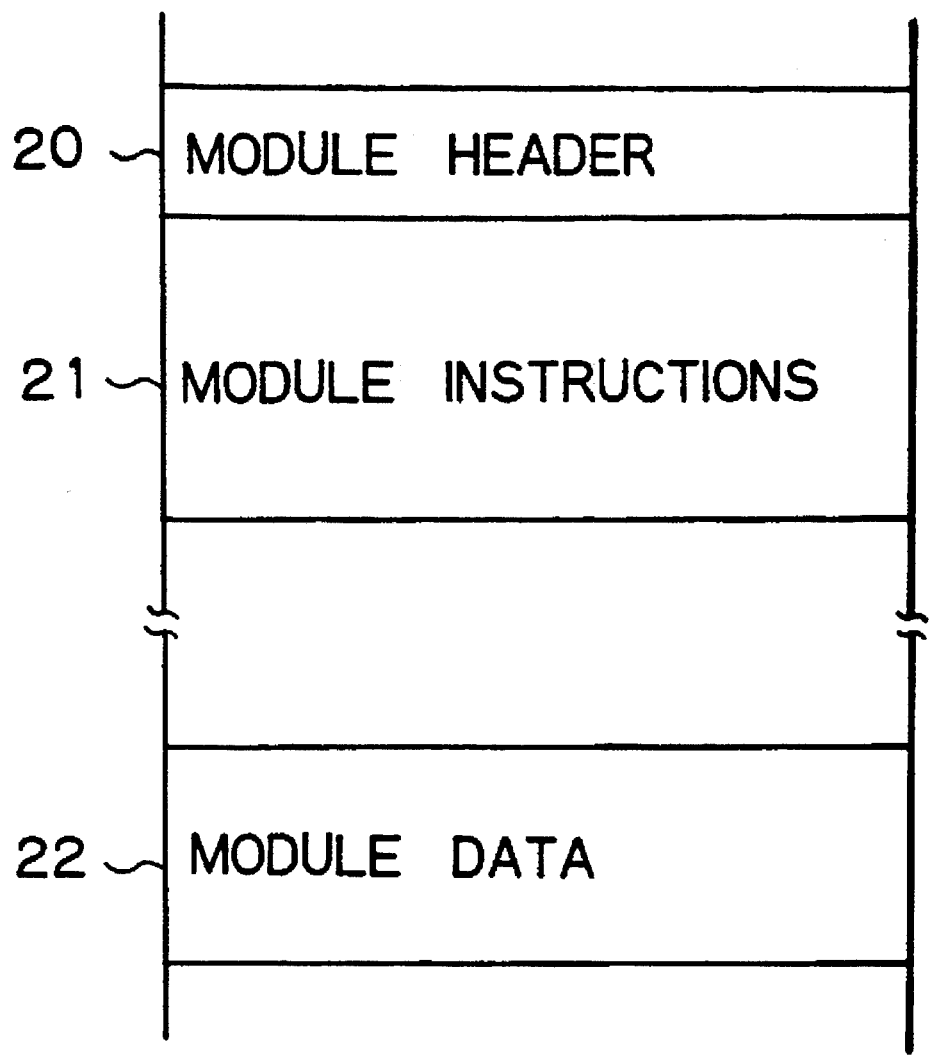
FIG. 2 shows a memory map representative of a module program stored in a memory unit.

Referring to FIGS. 1 and 2, a central processor unit (CPU) with cache memory embodying the invention is generally designated by the reference numeral 2. As shown, the CPU 2 is implemented on a single semiconductor chip and is loaded with two independent cache memories, i.e., cache memories 3 and 4 assigned to instructions and operands, respectively. The CPU 2 reads program sequences out of a memory unit or main storage 1 at high speed via the cache memories 3 and 4 to execute the program sequences.

The main storage 1 has capacity of several hundred megabytes and comprises a large capacity RAM (Random Access Memory) such as a DRAM (Dynamic RAM). The average access time of the main storage 1 is of the order of 50 to 100 nanoseconds. The main storage 1 stores programs which may be executed by the CPU 2, on a module-by-module basis.

As shown in FIG. 2, each program or module program has a module header 20, module instructions 21, and module data 22. The module header 20 defines the kind of processing to be executed with the program and describes the size of arguments of the module instructions 21 and module data 22. The module header 20 is stored in the main storage 1 heading the module program. The module instructions 21 describe the sequence of steps included in the module program and stored in storage locations of the main storage 1 next to the module header 20. The block made up of the module header 20 and module instructions 21 form an instruction area in the main storage 1. The module data 22 describe specific numerical data and other similar data particular to the module program. Generally, the module data 22 are stored in the main storage 1 in a data area which is remote from the above-mentioned instruction area.

Referring again to FIG. 1, the CPU 2 has an instruction control section 5, a processing section including an arithmetic and logical unit (ALU) 6, a cache monitor section 11, and a bus controller 12 in addition to the cache memories 3 and 4. The one cache memory or instruction cache 3 assigned to instructions is constituted by a high speed, small capacity RAM. For example, the instruction cache 3 is implemented by an SRAM (Static RAM) capable of transferring data at high speed, e.g., with a cycle time of several nanoseconds, and having a storage capacity of several kilobytes. In the illustrative embodiment, the instruction cache 3 reads, for example, sixteen bytes of data by one entry and one block of data by a plurality of consecutive entries. This kind of reading system is known as a set associative system. The cache 3 reads and stores, among the constituents of the module program stored in the main storage 1, the module headers 20 and module instructions 21.

The other cache memory or operand cache 4 assigned to operands is also constituted by a high speed, small capacity RAM such as an SRAM. In this embodiment, the operand cache 4 reads only the module data 22 out of the main storage 1 and operable with the set associative principle also. In the event data are to be written to the main storage 1, the operand cache 4 writes them to itself and transfers them to the main storage 1 at the same time, data by data. Such a system is generally referred to as a write-through type system.

The instruction control section 5 decodes the module instruction 21 fed thereto from the instruction cache 3 and controls constituent elements included in the CPU 2 in response to the instructions 21 thus decoded. The instruction control section 5 and instruction cache 3 are interconnected by an instruction bus 8 which, in practice, is constituted by sixty-four bit lines, for example.

The CPU 2 is operable in pipelining in the illustrative embodiment. For this aim, the instruction control 5 is adapted to be pipelined to include a pipeline control 30, as shown in FIG. 1. The pipeline control 30 is interconnected to the processing section 6 by a connection 32 to control the processing section 6 in a pipelining mode. That pipelining structure enables the processing section 6 to be operative to start one instruction sequence before completing another preceding to the former. The pipeline control 30 includes FIFO memories and registers, not shown, in which instructions fetched from the instruction cache 3 are temporarily stored to be timed with the processing executed by the instruction control 5 while the latter decodes the instructions, establishes the addresses of operands to be fetched land causes the operands to be fetched. The instruction control 5 thus decodes the instructions to control the processing section 6 with a predetermined delay given by the pipeline control 30.

The processing section (ALU) 6 performs arithmetic and logical operations in pipelining with the module header 20 and module data 22 which are transferred thereto from the instruction cache 3 and operand cache 4, respectively. The processing section 6 and operand cache 4 are interconnected by an operand bus 9 which is made up of thirty-two bit read lines and thirty-two bit write lines, for example. The processing section 6 and instruction cache 3 are interconnected by, for example, a thirty-two bit header bus 10, which is represented by a single solid line in the figure.

The cache monitor section 11 is operatively interconnected to the bus controller 12, instruction cache 3 and operand cache 4 to monitor the addresses of the instruction cache 3 and operand cache 4 to determine which of the data read out of the main storage 1 has been loaded in the caches 3 and 4. When data to be transferred to the instruction control section 5 or the processing section 6 is stored in the cache 3 or 4, the cache monitor section 11 inhibits the read-out from the main storage 1 by controlling the bus controller 12. Also, by controlling the bus controller 12, the cache monitor section 11 distributes data read out of the main storage 1 to the caches 3 and 4. In other words, bus controller 12 distributes data transferred over the memory bus 7 from the main storage 1 to the caches 3 and 4 in response to the cache monitor 11.

The illustrative embodiment controls the instruction and operand caches 3 and 4, as follows. Assume that, while executing certain program sequences as a main program, the CPU 2 intends to call a subroutine or similar program by interrupting or transferring the main processing. Then, the CPU 2 fetches the module header 20 of the subroutine program from the main storage 1 to the processing section 6 via the instruction cache 3. Specifically, the CPU 2 causes the cache monitor section 11 to determine whether or not the module header 20 is existing in the instruction cache 3. If the answer is positive, i.e. if the module header 20 is present in the cache 3, the CPU 2 transfers the module header 20 from the cache 3 to the processing section 6 over the header bus 10. At this stage, the probability that the module header 20 is present in the cache 3 is actually low since the operation has just been transferred from the main routine to the subroutine. Nevertheless, the above decision is meaningful, although not indispensable, in this embodiment in as much as, when the leading program of the subroutine is stored in close proximity to the main routine, the module header 20 of the subroutine may chance to exist in the cache 3.

When the cache monitor section 11 determines that the module header 20 is absent from the instruction cache 3, the CPU 2 fetches it from the main storage 1 to the cache 3 over the memory bus 7. More specifically, the CPU 2 delivers the module header 20 read out of the main storage 1 on the memory bus 7 to the cache 3 by controlling the bus controller 12. The cache 3 in turn transfers the read out module header 20 to the processing section 6 by way of a path A which extends across the header bus 10. It is to be noted that the module header 20 is transferred from instruction cache 3 to processing section 6 to bypass the instruction control 5, including pipeline control 30, which is comprised of the FIFO memories and the registers as discussed earlier, which would otherwise cause a delay in transferring the module header 20. This results in the processing section 6 obtaining the module header 20 without delay otherwise caused by the pipeline control 30. While writing the module header 20 to itself, the cache 3 reads a block of module instructions 21 following the module header 20 and writes the whole block to itself. The processing section 6 performs arithmetic and logical operations with the module header 20 to prepare for the next processing.

Subsequently, the CPU 2 executes a sequence of steps for calling the leading one of the block of module instructions 21. In the above-mentioned situations, the leading module instruction has already been written to the instruction cache 3. Determining that the leading module instruction 21 is present in the cache 3, the cache monitor section 11 controls the bus controller 12 to inhibit further access to the main storage 1. The cache 3 transfers the leading module instruction 21 to the instruction control section 5 over the instruction bus 8. In response, the instruction control section 5 decodes the input module instruction 21 and then executes it.

Thereafter, the CPU 2 causes the cache monitor section 11 to continuously monitor instruction cache 3 to see if a module instruction 21 to be executed has been written to the cache 3. Every time a module instruction 21 is found in the cache 3, it is transferred from the cache 3 to the instruction control section 5 to thereby execute a program. If no module instructions 21 are loaded in the cache 3, then the CPU 2 accesses the main storage 1 via the cache 3 to read out a module instruction 21 therefrom.

At the same time, the CPU 2 causes the cache monitor section 11 to monitor the operand cache 4 to see if any module data 22 for arithmetic and logical operations is present in the cache 4. If such data is present in the cache 4, it is transferred from the cache 4 to the processing section 6 so as to accomplish arithmetic and logical operations. When module data 22 are to be processed for the first time in a subroutine program, no module data 22 will have been stored in the cache 4. Hence, the CPU 2 makes access to the main storage 1 via the cache 4 to read module data 22 therefrom and transfers them to the processing section 6. At the same time, the CPU 2 writes a block of data around the module data 22 of interest to the cache 4 along with the data of interest. This increases the probability that data to be read out next is already present in the cache 4. When the subroutine program is completed in the manner described above, the operation is returned to the main program.

As stated above in detail, when the CPU 2 calls a subroutine or similar module program stored in the main storage 1, it transfers the module header 20 associated with the program to the processing section 6 via the instruction cache 3. In this instance, in the illustrative embodiment, the CPU 2 registers the whole block of module header 20 and successive module instructions 21 in the cache 3. Hence, after the module header 20 has been processed, the leading one of the module instructions 21 of the module program can be read out immediately. This is successful in increasing the hit ratio of the cache 3 at the beginning of the execution of a program. The increase in the hitting ratio of the cache 3 allows the module instructions 21 to be read out within a short period of time which is of the order of several nanoseconds and is a remarkable improvement over the conventional access time of 50 to 100 nanoseconds to a main storage.

The illustrative embodiment makes it needless for the operand cache 4 to be wastefully loaded with the module header 20 and module instructions 21, thereby enhancing efficient use of the cache 4. Specifically, it is not necessary for the operand cache 4 to rewrite the previous data at the beginning of a module program. This would be necessary if the module header 20 which is to be used only once and the module instructions which do not have to be registered in the cache 4 were registered in the cache. Further, when module data 22 is to be read out of the main storage 1, the embodiment saves the time otherwise required for deleting the whole block of module header 20 and module instructions 21 stored in the cache 4 and then writing fetched module data 22 in the cache anew.

Figure 3:
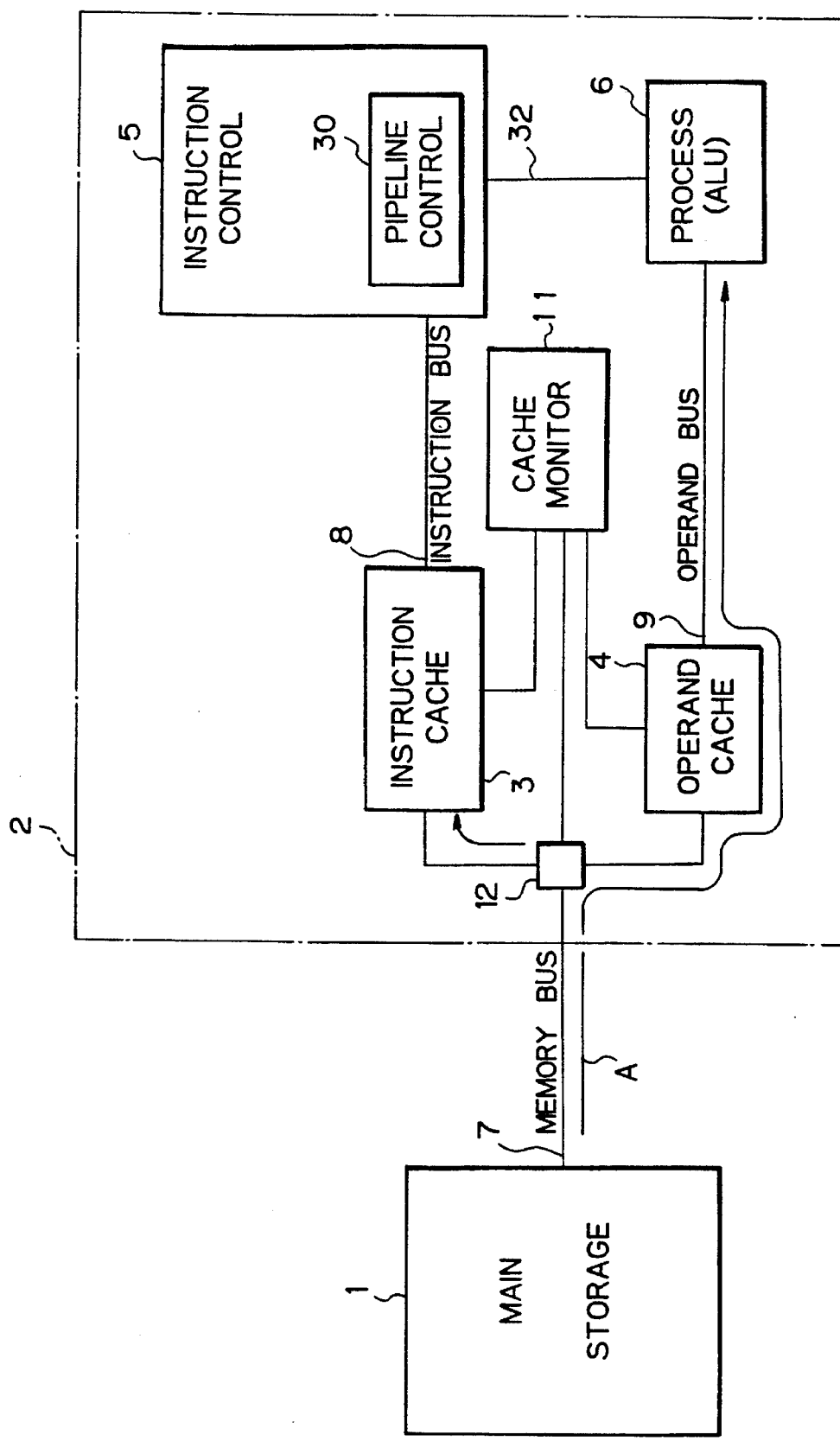
FIG. 3 is a block diagram schematically showing an alternative embodiment of the present invention.

A reference will be made to FIG. 3 for describing an alternative embodiment of the cache control method in accordance with the present invention. As shown, the alternative embodiment is different from the previously described embodiment in that the header bus 10 is not provided between the instruction cache 3 and the processing section 6. Another difference is that in the event the CPU 2 reads a subroutine or similar program out of the main storage 1 for executing the program, it reads the module header 20 leading the module program via the operand cache 4 and transfers the program to the processing section 6. A further difference is that while so transferring the program to the pocessing section 6, the CPU 2 writes a block of data including a module header 20 and successive module instructions 21 to the instruction cache 3.

Specifically, the CPU 2 calls a subroutine program, for example, while executing a main program, as follows. At first, the CPU 2 checks the operand cache 4 to see if the module header 20 of the program of interest is present therein, by using the monitoring function of the cache monitor section 11. If the module header 20 is present in the cache 4, the CPU 2 transfers it from the cache 4 to the processing section 6 over the operand bus 9. At the same time, the cache monitor section 11 controls the bus controller 12 to call a block in which the module header 20 and the leading one of successive module instructions 21 exist from the main storage 1 and registers it in the instruction cache 3.

If the module header 20 is not present in the operand cache 4 as determined by the cache monitor section 11, the CPU fetches the module header 20 and the leading module instruction 21 over the memory bus 7 and transfers them to the caches 3 and 4. In response, the operand cache 4 transfers the module header 20 to the processing section 6 over the operand bus 9. The instruction cache 3 is loaded with the block including the module header 20 and the first module instruction 21. The processing section 6 performs arithmetic and logical operations with the module header 20 fed thereto from the cache 4 to thereby prepare for the next processing.

After the sequence of steps described above, the CPU 2 causes the cache monitor section 11 to detemine whether or not the first module instruction 21 is present in the instruction cache 3. If the answer is positive, the CPU 2 transfers the first module instruction 21 from the cache 3 to the instruction control section 5 over the instruction bus 8. The instruction control section 5 decodes the first module instruction 21 and then executes processing in response to the results from decoding.

If the first module instruction 21 is not present in the instruction cache 3 as determined by the cache monitor section 11, the CPU 2 again fetches the first module instruction 21 from the main storage 1 over the memory bus 7 and transfers it to the cache 3. The cache 3 in turn transfers the first module instruction 21 to the instruction control 5 over the instruction bus 8. In response, the instruction control section 5 decodes the first module instruction 21 and executes it. The CPU 2 executes the subroutine or module program in the above-described manner In summary, when a module header 20 is transferred to the processing section 6 in order to alternative embodiment call a module program, the registers the whole block of module header 20 and successive module instructions 21 in the instruction cache 3. Hence, the probability that the leading module instruction 21 exists in the cache 3 is high, increasing the hit ratio of the cache 3. It follows that the probability that the CPU 2 accesses the main storage 1 and, therefore, the access time is considerably reduced. Specifically, after the CPU 2 has accessed the main storage 1 for calling a module header 20, it can make access to the module instructions 21 without accessing the main storage 1. As a result, the time necessary for the CPU 2 to access the main storage 1 is reduced from the conventional 50 to 100 nanoseconds to the order of several nanoseconds.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention. For example, while the CPU 2 has been shown and described as being implemented as a single semiconductor chip loaded with two cache memories 3 and 4, the cache memories 3 and 4 may be constituted on an independent chip.

What I claim is:

1. A dual cache memory device for use in a CPU (central processor unit) connected to a memory bus of a memory unit in which at least two module programs are stored, each of which module programs includes module instructions, module data to be processed by the module instructions, and a module header locating the module data which is stored in a location following the module header, comprising:

processing means for performing arithmetic and logical operations with module data of the module programs, and performing arithmetic and logical operations with the module header of a second one of the module programs following execution of a first module program to prepare for processing defined by the second module program;

pipeline instruction control means oeprative in pipelining for decoding the module instructions, executing processing defined by decoded module instructions, and controlling said processing means in response to decoded module instructions;

instruction cache memory means connected to the memory bus through a bus controller and said pipeline instruction control means for storing therein the module header and the module instructions;

operand cache memory means connected to the memory bus through said bus controller and said processing means for storing therein the module data;

a header bus for connecting said instruction cache memory means to said processing means and conveying a block of module instructions from said instruction cache memory means to said processing means; and cache monitoring means connected to said instruction cache memory means, said operand cache memory means and said bus controller for monitoring said operand cache memory means to determine whether or not the module data is stored in said operand cache memory means, and further monitoring said instruction cache memory means to determine whether or not a block of module instructions is stored in said instruction cache memory means to control said instruction cache memory means, said operand cache memory means and said bus controller;

said cache monitoring means controlling, when module data is not stored in said operand cache memory means, said bus controller and said operand cache memory means to read out module data for arithmetic and logic operations inclued in the module program from the memory unit to transfer said processing means the module data read out to said operand cache memory means;

said cache monitoring means controlling, when a block of module instructions is not stored in said instruction cache memory means, said bus controller and said instruction cache memory means to read out a module header of a module program and a block of module instructions following the module header from the memory unit to transfer to said processing means over said header bus the block of module instructions read out to said instruction cache memory means.

2. A dual cache memory device for use in a CPU in accordance with claim 1, wherein said CPU is integrally formed on a single chip substrate together with said instruction cache memory means, said operand cache memory means, said bus controller and said instruction control means.

3. A dual cache memory device for use in a CPU in accordance with claim 1, wherein said CPU is formed on a first semiconductor chip substrate, and said instruction cache memory means and said operand cache memory means are formed on a second semiconductor chip substrate independent of said first semiconductor chip substrate.

4. A dual cache memory device for use in a CPU in accordance with claim 1, further comprising an operand bus for interconnecting said operand cache memory means to said processing means, and an instruction bus for interconnecting said instruction cache memory means to said pipeline instruction control means.

5. A method of controlling a dual cache memory device for use in a CPU (central processor unit) connected to a memory bus of a memory unit, comprising the steps of:

storing module programs in the memory unit, each of the module programs including module instructions, module data to be processed by the module instructions and a module header defining an address of the module data which is stored in a location following the module header;

providing an instruction cache memory and an operand cache memory;

providing a processor for performing arithmetic and logical operations with module data of the module programs, and performing arithmetic and logical operations with the module header of a second one of the module programs following execution of a first one of the module programs to prepare for processing defined by the second module program;

providing a pipeline instruction control circuit operative in pipelining for decoding the module instructions, and executing processing defined by the decoded module instructions;

monitoring the operand cache memory to determine whether or not the module data is stored in the operand cache memory;

monitoring the instruction cache memory to determine whether or not a block of module instructions is stored in the instruction cache memory;

reading out, when module data is not stored in the operand cache memory, module data for arithmetic and logic operations included in the module program from the memory unit to transfer to the processor, the module data read out to the operand cache memory;

reading out, when a block of module instructions is not stored in the instruction cache memory, a module header of a module program and a block of module instructions following the module header from the memory unit to transfer to the processor the block of module instructions read out to the instruction cache memory.

* * * * *